C. S. BARRELL.
SHOCK ABSORBER.
APPLICATION FILED FEB. 14, 1916.
1,282,712.  Patented Oct. 22, 1918.
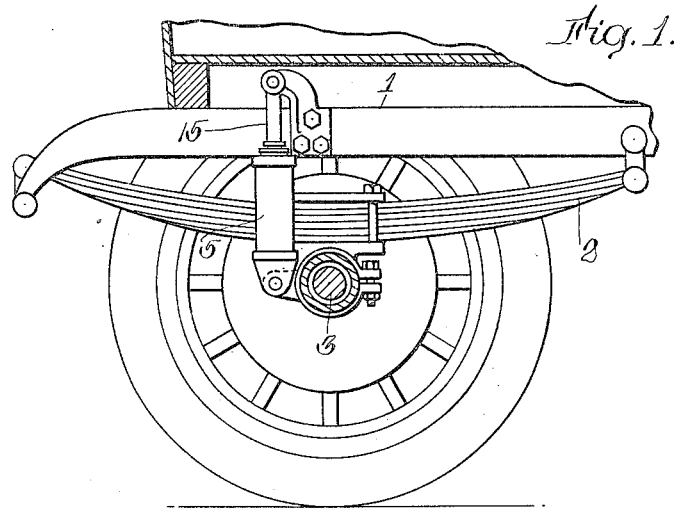
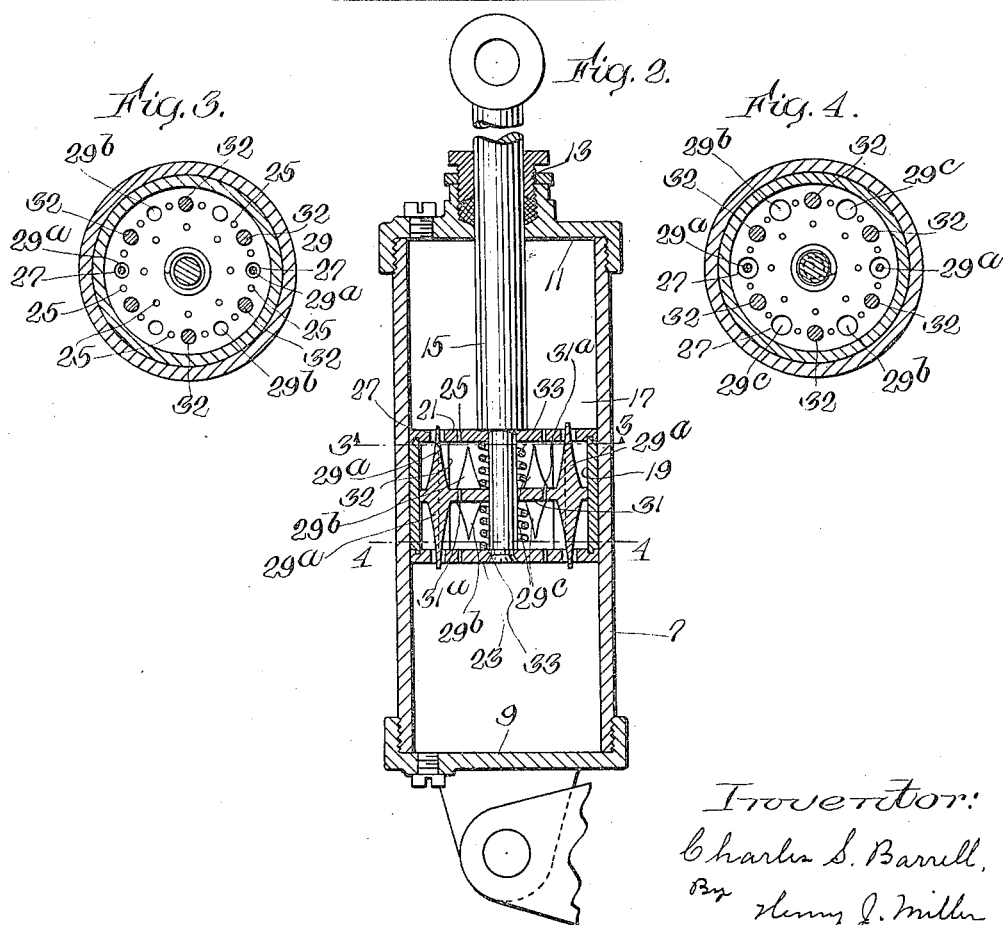
Inventor:
Charles S. Barrell,
By Henry J. Miller
atty.

UNITED STATES PATENT OFFICE.

CHARLES S. BARRELL, OF BOSTON, MASSACHUSETTS.

SHOCK-ABSORBER.

1,282,712.  Specification of Letters Patent.  Patented Oct. 22, 1918.

Continuation of application Serial No. 715,789, filed August 19, 1912. This application filed February 14, 1916. Serial No. 78,196.

*To all whom it may concern:*

Be it known that I, CHARLES S. BARRELL, a citizen of the United States, residing at Boston, in the county of Suffolk and State of Massachusetts, have invented new and useful Improvements in Shock-Absorbers, of which the following is a specification, reference being had to the accompanying drawings, forming part thereof.
This invention relates to shock absorbers for vehicles and other uses, and among other objects provides a shock absorber which offers little restriction to the free operation of the vehicle springs when the vehicle is running over normal roads, but is effective to check both a downward jolt and upward recoil of the vehicle body on meeting any irregularity in the road.

The present application is a continuation of the application filed by applicant August 19, 1912, Serial No. 715,789.

The character of the invention may be best understood by reference to the following description of an illustrative embodiment thereof shown in the accompanying drawings, wherein:

Figure 1, is a side elevation of a portion of a vehicle equipped with an illustrative shock absorber embodying the invention.
Fig. 2, on an enlarged scale is a vertical section through the shock absorber shown in Fig. 1.

Fig. 3, is a section taken on line 3—3 of Fig. 2, and Fig. 4, is a section taken on line 4—4 of Fig. 2.

Referring to the drawing, 1 designates the chassis of an automobile and 2 one of the springs connected to the axle 3 of the running gear. The illustrative shock absorber is shown at 5 and comprises a cylinder 7 (Fig. 2) having heads 9 and 11, the former being pivotally connected to the axle 3. The head 11 is provided with a stuffing box 13, or other suitable leak preventing device, through which extends a piston rod 15 having one end pivotally connected to the chassis. The opposite end is reduced and receives a plunger or piston 17.
A shock absorber should offer little resistance to small vibrations of the vehicle springs, but should be effective to check both a sudden quick jolt thereon and the recoil thereof.
To provide a shock absorber which will operate in this manner the piston 17 may be in the form of a hollow cylinder having heads 21 and 23. To permit the fluid to pass through the piston the heads may be provided with small apertures 25, preferably continuously open and with controlling apertures 27 of a size and number according to the flow desired. To variably resist the passage of the fluid through the controlling apertures 27, they may be throttled or their effective openings varied by valve means typified herein in the form of cone-like projections 29$^a$, 29$^b$ and 29$^c$. These projections may enter apertures of different sizes or of the same size, and may be of different lengths in order that they may progressively enter their apertures to vary the resistance to the fluid flow therethrough. For example, a cone projection 29$^a$ may be sufficiently long to normally occupy its aperture without filling the same, a cone projection 29$^b$ may be somewhat shorter and be in readiness to enter its aperture when in normal position; and a cone projection 29$^c$ may be still shorter and enter its aperture after the cone projections 29$^a$ and 29$^b$ have entered their apertures.

These cone valves may be carried by and project in opposite directions from a diaphragm or disk 31 mounted within the hollow piston. To guide this disk it may be centrally apertured to slide upon a reduced end of the piston stem. To prevent any possibility of the disk 31 binding against the cylindrical wall of the piston, suitable guide means may be provided, herein in the form of posts 32 projecting through apertures in said disk and secured to the heads 21 and 23.
To permit a restricted escape of fluid through the disk it may have small controlling apertures 31$^a$ therein. To tend to maintain the disk in a position midway between the hollow piston heads 21 and 23 there may be provided helical springs 33 encircling the portion of the piston stem within the piston and confined between said disk and piston heads.

The apertures in one of the piston heads may be different from those in the other if desired in order to offer greater resistance to the movement of the piston in one direction than in the other. For example, it may require a greater force to resist the recoil of the body than the downward jolt thereof. In such case it is desirable to have the apertures in the upper head of the piston smaller than those in the lower head of the piston. In Fig. 3 are shown illustrative apertures for the upper head smaller than the apertures shown in Fig. 4 for the lower head.

In operation, while the vehicle is going over normally smooth roads the fluid will flow through the apertures in the heads 21 and 23 and disk 31 from one side of the piston to the other with little opposition since the springs 33 are of sufficient strength to maintain the disk 31 in mid position holding the cone valves open under such conditions.

In the event that the vehicle strikes a gulley or abnormal obstruction the vehicle will receive a sudden jolt which will throw its body downward. This sudden movement is imparted to the piston through the piston rod connecting the same with the body. Owing to the restricted passage through the disk 31, the fluid does not readily escape therethrough. As a result, said disk 31 is automatically moved from its said position and compresses the upper spring, and causes the cone valves 29ª, 29ᵇ, and 29ᶜ to throttle the apertures in the upper piston head 21 more or less according to the amount of movement of said disk and thereby restrict the flow of fluid through the piston and check the downward movement of the same.

In a similar way, on the recoil, the disk 31 will be moved in an opposite direction and cause the lower cone valves 29ª, 29ᵇ and 29ᶜ to project through the apertures in the lower head of the piston. As a result, the vehicle body is not only effectively checked in its downward movement, but also in its upward movement.

The cylinder may contain air, oil or any other suitable fluid.

In case a liquid is used the springs tending to hold the disk in mid position operate advantageously, since they yield and prevent a sudden arrest or jar of the piston on the impact of the latter with the non-compressible liquid beneath the piston.

By my invention there is provided a shock absorber which is simple in construction and operation, which offers little resistance to small vibrations of the vehicle body, but effectually checks any downward jolt and recoil of the vehicle with a resistance proportionate to the speed of vibration of the body.

Having described one embodiment of the invention without limiting the same thereto, what I claim as new and desire to secure by Letters Patent is:

1. A shock absorber comprising, in combination, a fluid containing cylinder, a hollow piston reciprocable therein having apertured heads, a diaphragm in said piston having conical valves for throttling the apertures in said heads, and spring means tending to maintain said valves in open position.

2. A shock absorber comprising, in combination, a fluid containing chamber, a hollow piston reciprocable therein, a rod secured to said piston, a diaphragm in the latter, valve projections for throttling apertures in opposite ends of said piston, and spring means for holding said valve projections open during normal movements of said piston and yieldable to permit the automatic throttling of said apertures by said valve projections on sudden movements of said piston.

3. A shock absorber comprising, in combination, a fluid containing chamber, a hollow piston reciprocable therein having heads provided with apertures of different sizes, and valve means in said piston having provision for holding the same open during normal movements of the piston and automatically operable to throttle the apertures on sudden quick movements of the piston.

4. A shock absorber comprising, in combination, a fluid containing chamber, a hollow piston reciprocable therein having apertured heads, oppositely projecting cone valves for throttling the apertures in said heads, and means tending to maintain said valves in an intermediate open position.

5. A shock absorber comprising, in combination, a fluid containing chamber, a piston reciprocable therein having a head constituted by coöperating relatively movable throttling members one of which has a passage and the other of which has a tapering throttling element to enter said passage at times.

6. A shock absorber comprising a fluid containing chamber, a piston reciprocable therein and constituted by two members having contemporaneous and relative movement one of said members having passages therethrough and the other said member having means for throttling said passages progressively in two directions, and means to yieldingly sustain said members in unthrottling relation.

7. A shock absorber comprising, in combination, a fluid containing chamber, a piston reciprocable therein and having a pair of members each having a plurality of passages, spring means carried by said piston, and a member yieldingly sustained by said spring means from movement toward either of said piston members and having a series of throttling devices of varying length and cross section to coöperate with said passages.

CHARLES S. BARRELL.